US008165922B2

(12) United States Patent  
Constantinescu (10) Patent No.: US 8,165,922 B2  
(45) Date of Patent: Apr. 24, 2012

(54) PHYSICAL ON DEMAND TESTING WITH VERSION SUPPORT

(75) Inventor: Catalin Constantinescu, Plymouth, MN (US)

(73) Assignee: Digital River, Inc., Minnetonka, MN (US)

( * ) Notice: Subject to any disclaimer, the term of this patent is extended or adjusted under 35 U.S.C. 154(b) by 1348 days.

(21) Appl. No.: 11/686,843

(22) Filed: Mar. 15, 2007

(65) Prior Publication Data

US 2007/0219876 A1 Sep. 20, 2007

Related U.S. Application Data

(60) Provisional application No. 60/782,825, filed on Mar. 15, 2006.

(51) Int. Cl.
*G06Q 30/00* (2012.01)

(52) U.S. Cl. .................................................. 705/26.5

(58) Field of Classification Search ............... 705/1, 26, 705/26.24, 26.5, 27, 26.1, 26.25, 27.1; 717/175
See application file for complete search history.

(56) References Cited

U.S. PATENT DOCUMENTS

| | | | |
|---|---|---|---|
| 5,418,654 A | 5/1995 | Scheffler | |
| 5,418,713 A | 5/1995 | Allen | |
| 5,794,217 A | 8/1998 | Allen | |
| 5,878,141 A | 3/1999 | Daly et al. | |
| 5,900,830 A | 5/1999 | Scheffler | |
| 5,918,213 A | 6/1999 | Bernard et al. | |
| 5,930,768 A | 7/1999 | Hooban | |
| 5,960,412 A | 9/1999 | Tackbary et al. | |
| 2003/0036974 A1 | 2/2003 | Allen | |
| 2003/0069811 A1 | 4/2003 | Ximenes et al. | |
| 2003/0167259 A1 | 9/2003 | Casson et al. | |
| 2004/0054630 A1* | 3/2004 | Ginter et al. | 705/53 |
| 2004/0078293 A1 | 4/2004 | Iverson et al. | |
| 2006/0064389 A1* | 3/2006 | Doll-Steinberg | 705/59 |
| 2006/0197879 A1* | 9/2006 | Covell et al. | 348/700 |
| 2007/0266444 A1* | 11/2007 | Segal | 726/27 |

OTHER PUBLICATIONS

Kathleen M. Joyce, "Screen Test," Dec. 2004, Promo. Danbury, vol. 18, Iss. 1, p. 17.*

* cited by examiner

*Primary Examiner* — Jeffrey A Smith  
*Assistant Examiner* — Brandy A Zukanovich  
(74) *Attorney, Agent, or Firm* — North Oaks Patent Agency; Shawn B. Dempster; Lynn M. Holly (57) ABSTRACT

A method for testing versions for remote manufacturing of software media from a network is described. An interface to a user is provided for creation of a physical on demand product. A product version is created for the physical on demand product that includes an electronic copy of a product and information about the product. Approval of the created product version is requested from quality assurance. A test order capability is provided to the user after approval from quality assurance such that the user may have a physical on demand product order fulfilled prior to release of the product version for general sale in a commerce engine. The delivery of the test order is processed based upon who is requesting the test order. A software system that performs the testing method described above for the creation of compact discs (CDs) or digital video discs (DVDs) containing full product files (executables, binaries, music, video, etc.) also is described.

14 Claims, 12 Drawing Sheets

PHYSICAL ON DEMAND TESTING WITH VERSION SUPPORT

RELATED APPLICATIONS

This application claims the benefit of U.S. Provisional Application No. 60/782,825 filed 15 Mar. 2006, entitled "Physical On Demand," which is incorporated herein by reference.

FIELD OF THE INVENTION

The present invention relates to remote manufacturing of software media over a network. More particularly, the present invention relates to a system and related method for creating and managing production of physical copies of software.

BACKGROUND OF THE INVENTION

Historically, to make physical software, one would have to make many copies of the product which may or may not sell before the product is obsolete. A need exists for a system that allows you to sell physical copies of your software created to order. No extra inventory is left on hand and there is no need to dispose of obsolete products. The issue from an administrative point of view, is that all of the compact disc (CD) or digital video disc (DVD) contents and graphics have to be uploaded and maintained. Software publishers generally want to produce on demand software CDs or DVDs as required for purchases to avoid maintenance of the stock of product.

The present invention provides a solution to these needs and other problems, and offers other advantages over the prior art.

BRIEF SUMMARY OF THE INVENTION

The present invention is related to a software system that solves the above-mentioned problems. In accordance with one embodiment of the invention, system and method for testing versions for remote manufacturing of software media from a network is described. An interface to a user is provided for creation of a physical on demand product. A product version is created for the physical on demand product that includes an electronic copy of a product and information about the product. Approval of the created product version is requested from quality assurance. A test order capability is provided to the user after approval from quality assurance such that the user may have a physical on demand product order fulfilled prior to release of the product version for general sale in a commerce engine. The delivery of the test order is processed based upon who is requesting the test order. The testing system and method provides for the creation of compact discs (CDs) or digital video discs (DVDs) containing full product files (executables, binaries, music, video, etc.).

Additional advantages and features of the invention will be set forth in part in the description which follows, and in part, will become apparent to those skilled in the art upon examination of the following or may be learned by practice of the invention.

DETAILED DESCRIPTION

Figure 1:
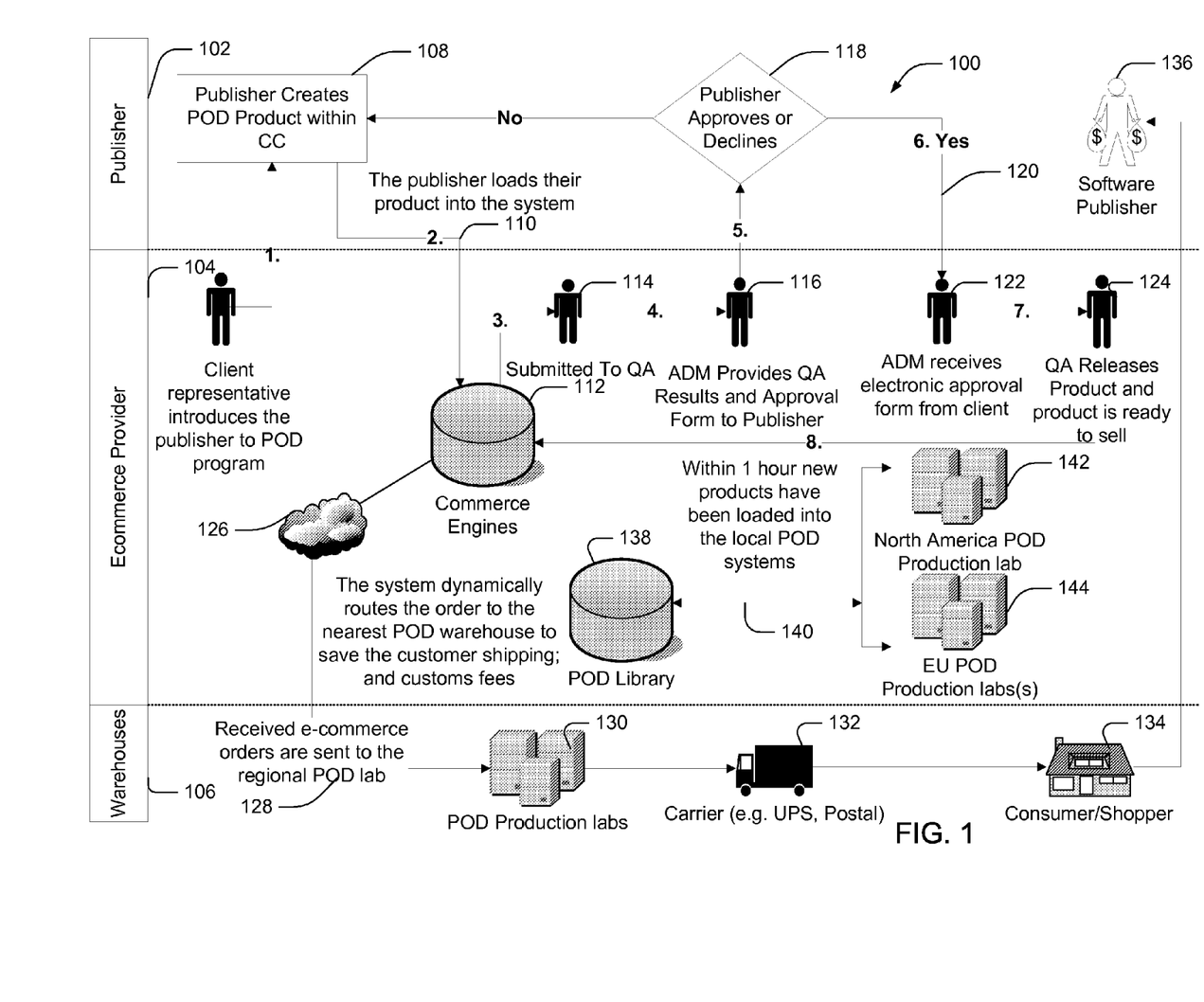
FIG. 1 shows a diagram of a physical on demand system.

FIG. 1 shows a preferred embodiment of the present invention physical on demand (POD) system 100. It will be appreciated by those skilled in the art that although the following describes creation of software CDs, the present invention may also be practiced with the creation of software, music, video CDs or DVDs without departing from the scope and spirit of the present invention. There are three main actors in this system 100, including a publisher 102, an e-commerce provider 104, and multiple warehouses 106.

Initially, a client representative of the e-commerce provider 104 introduces 107 the publisher 102 to the POD system 100. Subsequently, the publisher 102 creates 108 a POD product within a commerce system. After creating the POD product, the publisher 102 loads 110 their product source data into the commerce engine 112. Next, the POD product description and source data are submitted 114 to a quality assurance (QA) team at the e-commerce provider 104. Once QA is done, an account development manager (ADM) provides 116 quality assurance results and an approval form to the publisher 102. At this point, the publisher 102 approves or declines 118 publication of their product in the POD system. If the publisher declines, the process returns to the initial state 108 in the publisher's control. After publisher 102 approval 120, the ADM receives 122 electronic approval back from the publisher/client 102. Thereafter, QA releases 124 the product and the product is ready to sell.

Whenever commerce engine 112 receives new approved products, it updates a POD library 138. Within approximately one hour, new product information is loaded 140 into local POD systems in various parts of the world. These local POD systems may be located in a North American production lab 142, a European production lab 144, or other locations like Japan, Australia or India.

When orders for the product are received 126 by the e-commerce provider 104 for the product, the system dynamically routes the order to the nearest POD warehouse 106. The nearest POD warehouse 106 is calculated to be the one that saves the customer the most shipping and customs fees. Received e-commerce orders are sent 128 to the regional POD production lab 130 where a software CD is produced and shipped via a carrier 132 (e.g. UPS, postal service) to the end consumer/shopper 134. At this point, a software publisher 102 is paid 136. Note, a publisher 102 is only charged a processing fee by an e-commerce provider 104 for actual orders, there are no extra fees or hidden costs.

For products that are fulfilled through physical on demand, a publisher will have the ability to maintain the following information:

Case Label information; includes image, spine text and text color, front case text areas and associated colors (areas yet to be defined);

CD Information; includes background image and text color; and

Files; upload and associate files required for product. Space required for the files will require validation. The system must ensure that the files take up no more than 2 CD's worth of space. In the event that this occurs, an error will be displayed to the user The commerce engine 112 shall support an FTP process for moving uploaded binaries and executables to the POD servers 130 upon activation. The commerce engine 112 shall support physical on demand as a Global Family. (Ex. Download, Physical, Software, Physical on Demand). Versions of these products will be handled as variations in the commerce engine 112. Fulfillment centers will support all shipping methods. For example, UPS Ground, Federal Express Overnight, Next-day, Second day UPS and DSS will be treated as separate shipping locations for support of their own internal SKU numbers.

The commerce engine 112 shall support post-CD activation process to alert mail groups of additions/changes to the client DVD insert file. Upon upload and activation of a new or existing product, the commerce engine 112 will email two Outlook defined mail groups (Operations, Print Vendors-TBD). Email contents will contain file attachments (such as Adobe PDF) of new/updated DVD insert received from vendor.

Product setup directory (CD files) should be limited to a size of 680 MB. This does not apply to images for labeling and jacket creation. Those files will be kept in a separate directory. In case of a production failure, the system will be developed to re-queue, and potential an event will trigger a configurable email notification with information about the system failure.

Product Purchase

At time of purchase for any product requiring CD fulfillment, a fulfillment request 154 will be forwarded to the Associated CD Fulfiller 130 for the site. Ordering a product as POD will not allow the client/customer to receive a Backup CD for that same product. POD products will be considered Requesting Fulfillment at time the of the fulfillment request. The Fulfiller 130 will supply a shipment notice. This notice will act as the indicator of fulfillment (triggering any events such as costing/accounting and order notifications).

Product Fulfillment

Physical on Demand machines will require the ability to print CD information in black and white and color. Shipping locales shall generate packing slips in the country's default language only (net fulfillment will create packing slips in English only). In the event a POD machine goes down, the second POD machine will maintain processing of requests. Upon receipt of a POD fulfillment request, the machine will extract all files required and burn to a CD. These files include executables and binaries. Case label generated for POD will contain:
Return address;
Mailing address; and
Barcode.
CD Labels generated will contain:
Customer Name;
Barcode;
Disc Number (example 1 of X); and
Order ID.

Barcodes contained on the Case Label and the CD Label will be scanned and matched to allow the completion of the pick/pack/ship process. Orders containing two CD's will require the ability to associate each CD barcode with the same label barcode.

Once product is shipment ready, the CD Fulfiller will create a shipment notice file. This file will contain order information as well as tracking information confirming orders that have been fulfilled. During the implementation, a time frame for these files will be established. The POD delivery will include a CD and Case. POD will be processed through typical accounting systems like physical fulfillment of products.

Post Fulfillment Processing

The process manager or owner will receive a shipment notice from each CD Fulfiller. Upon receipt of file, the order will be updated with shipment information, and a shipment confirmation notification will be forwarded to the customer with the provided tracking information. Costing/Accounting for shipped orders will be processed in the same manner as the physical orders. Once the order reaches a state of shipped, costing will be triggered and allow for recognition of revenue. Accounting will be notified (via email) to setup a transaction fee for physical orders based on each POD. Once set up, accounting personnel charge a standard fee for each unit. Attributes to facilitate Accounting/Costing for POD are: SKU#, VERSION ID and PRICE.

Customer Service

A preferred system, namely the commerce engine 112 will support:
Reships. Will function as a new order; and
A zero price will be charged to the customer; however the system should still charge the POD system. That cost will be transferred back to the vendor.

Digital (software) products cannot be returned physically. Therefore for this product we authorize the use of an electronic letter of destruction (eLOD). There is no impact to Customer Service. Physical on Demand will be integrated just as current physical fulfillment is integrated with Customer Service.

Reporting

The commerce engine 112 will generate additional reports to capture the following:
Number of live POD versions;
Sales by POD region, including (i) Region Codes: (North America, Europe, UK, APAC) and (ii) Filter by POD fulfillment center name; and
Average fee charged for POD product.

Accounting reports such as the penetration report will operate as it currently stands. Fulfillment of POD will be integrated to act as any physical fulfillment of product is currently reported to product owners.

Notifications

Standard Order Confirmation will be utilized for POD fulfillment. This fulfillment process will act as any physical fulfillment currently does. Customers will be informed that further notifications from e-commerce provider will indicate when fulfillment has been completed.

Production failure event notification will be utilized for POD. In the case of a system down or failure, the event will be logged in a database. From this status logged operation, a configurable email will be sent to notify a specified user(s) to take action.

Standard Shipping Confirmation will be utilized for POD fulfillment. Upon receipt of shipping notification from the Fulfiller, the e-commerce system will generate this notification to the customer to indicate that fulfillment has been completed and their product should be expected shortly.

Version Support

A product owner needs the ability to set up the digital content information to be shipped on demand. Before becoming available, the digital content delivery process (preparing the digital media and shipping it) needs to be tested. Digital content should be "versioned"—a new version of digital content should not affect the integrity of a prior digital content version of the same product. Digital content setup allows upload of digital content and electronic broadcast to all fulfiller locations. By adding versioning support, this ensures that broadcast of digital content changes will not interfere with "published" digital content.

Figure 4:
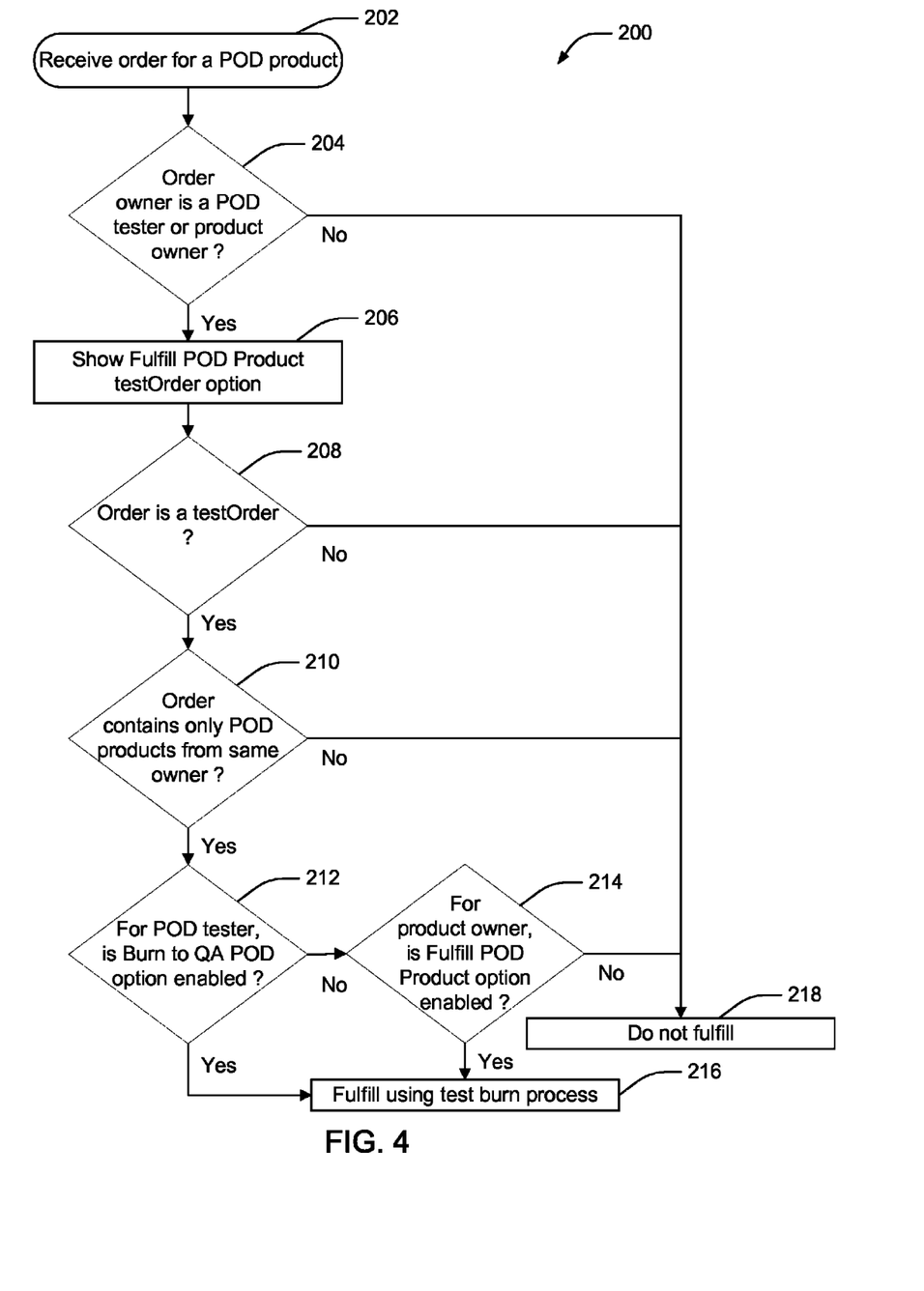
FIG. 4 shows a flowchart of process for testing a product in the POD system.

In addition, as further detailed in reference to FIG. 4, a test process support has been developed that relies on versioning with a new version fully broadcasted before tested. With the added approval process, approval relies on a test process such that any new version is published only after being tested and approved by quality assurance (QA) and the original product owner. A test consists of CD burn and shipment of new digital content version to someone.

FIG. 4 shows a flow chart of a preferred embodiment process 200 for using a POD system 100 to test order fulfillment by a POD tester or product owner prior to the product being released 124 for sale in the commerce engine 112. The process begins by receiving 202 an order or a POD product. The order is checked 204 to determine whether the order owner is a designated POD tester or product owner. If not, the order is not fulfilled 218. If it is, then the fulfill POD product testorder option is shown/provided 206 to the user. If the user confirms 208 the order as a test order, the order is checked 210 to determine whether it only contains POD products from the same owner. If there are orders from other owners or the user does not confirm the order, the order is not fulfilled 218. If the order does contain only POD products for the same owner, the order is checked 212 to determine whether, for POD tester initiated orders, the Burn to QA POD option is enabled. If so, the order is fulfilled 216 using the test burn process. The order is also checked 214 to determine whether, for product owner initiated orders, the Fulfill POD Product option is enabled. If so, the order is fulfilled 216 using the test burn process. If neither option is enabled, the order is not fulfilled 218.

As shown in the data diagrams of FIGS. 2 and 3 and the representative user interface pages shown in FIGS. 5 to 31, to implement this new test before completing the entire approval process, the QA approval queue management process is modified in the following ways:

- Add new PhysicalOnDemandTester role, map it to the physicalOnDemandManager drcc role and the maintainPODQueue drcc permission.
- Add new drcc menubar entry for users having the maintainPODQueue drcc permission and add new list page showing products awaiting QA approval.
- Add Status field on PODProductInfo class, and deprecate boolean isPendingQAApproval field.
- Add "approvalLastRequestedBy" column on PODProductFileSet class.
- Add "approvedBy" column on PODProductFileset class.
- Add three new notification events: PODApprovalNotificationEvent, PODRejectionNotificationEvent and NewPODCDCaseFileEvent.
- Product owners will be trained on placing live orders for products that are not viewable. This is to allow them testing of a POD product before approving the POD CD files.
- Add "getViewableVariations" method to ProductDetailsForm, to return all the viewable variations of a product under the current locale.
- Add logic to PhysicalOnDemandFamilyValidator, to ensure that a POD product can only be deployed if it already has a deployed File set, or it's design file set has already been approved by QA and the isViewable attribute has a value of "false".

Additionally, two changes were made to testorder logic. Both changes are dependent on the "ORDER_PLACED_BY_OWNER" value of the test requisition. If the testorder's "ORDER_PLACED_BY_OWNER" belongs to an internal user that has the PODTester role assigned, a new testorder option will be accessible, allowing to direct the ordered POD product to be burned on the QA CD burner. If the testorder's "ORDER_PLACED_BY_OWNER" belongs to the POD product owning company a new testorder option will be available, allowing the user to submit the order's POD fulfillment request to an actual fulfiller.

Figure 2:
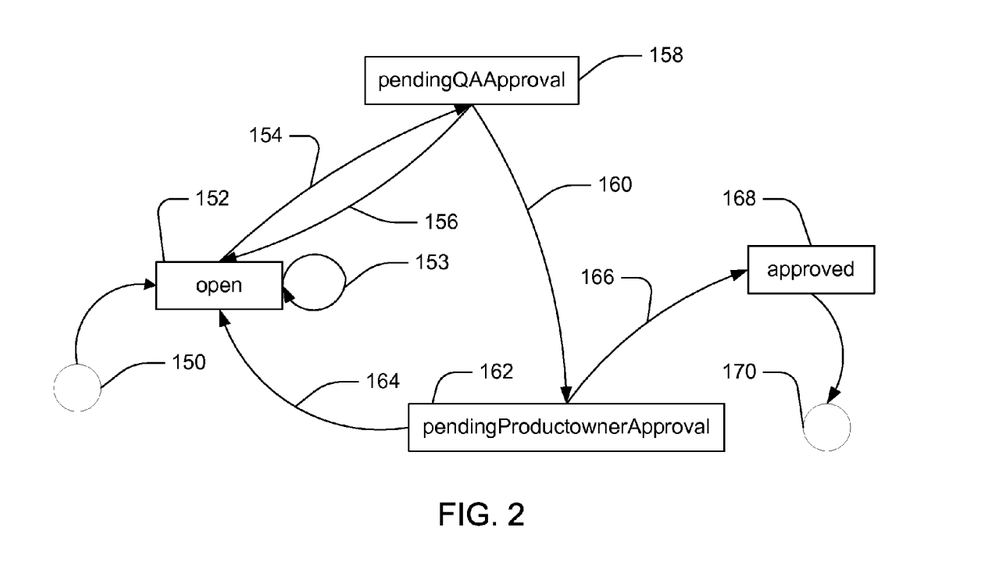
FIGS. 2 and 3 shows data diagrams for a test before approve process in the physical on demand system.
Figure 3:
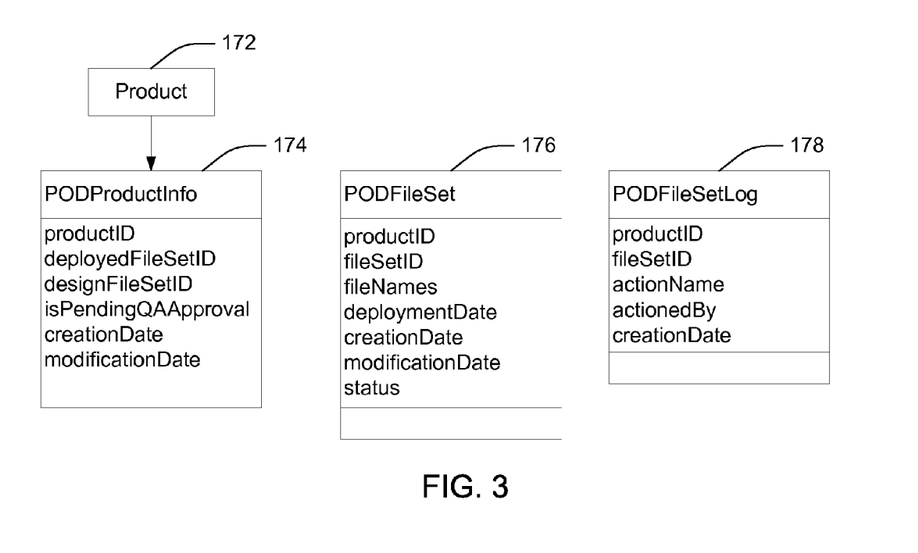

As a result of these changes, the approval process can now follow the state diagram steps shown in FIG. 2, which are further details of the process flow shown in FIG. 1 as approval process items 114, 116, 118, 120, and 122. It will be appreciated by those skilled in the art that the ADM involvement are not necessary steps for operation of this approval process, but may be inserted from time to time to facilitate communication with the product owner. In particular, once a product owner creates 150 a new product in the commerce engine 112 which opens or instantiates 152 a new instance of some POD class objects. This instance 152, as shown in FIG. 3, includes class objects for Product 172, PODProductInfo 174, PODFileSet 176, PODFileSetLog 178. With this new instance 152, several actions may take place that change the state of these objects. For example, the product owner may upload 153 a file. Once the product owner has entered product information and uploaded a file for the product, the product owner may request approval 154 of the new product loaded into the commerce engine 112 which moves the state to pending QA approval 158. While in this pending QA approval state 158, information in the instance/object 152 is locked until it is either rejected 156 or approved 160. If approved by QA 160, the state moves to pending product owner approval 162. In this state 162, the product owner may test and approve the instance/object 152. This is the state 162 when test orders may be placed on the product by the product owner and can be fulfilled by a fulfiller as is more fully detailed above in reference to FIG. 4. If the product owner rejects 164 the instance/object, the state is returned to the initial open state 152 where the product owner may modify information and files associated with this new product. If the product owner approves 166 the instance/object, then the state is moved to approved 168 by owner where the process may continue onto other steps 170 such as releasing 124 the product for sale.

These features and other details will be described further in reference to the user interface pages below.

Any site that supports POD products, should have variations properly filtered on the ProductDetails page, so a variation that is not set as viewable will not appear selectable on the detail page of its parent product.

User Interface

Below is a description of the web page flow of user interfaces, shown in FIGS. 5 through 31, for this process. When using a commerce engine with POD, a Physical On Demand product type appears as an option in the Create New Product wizard.

Figure 5:
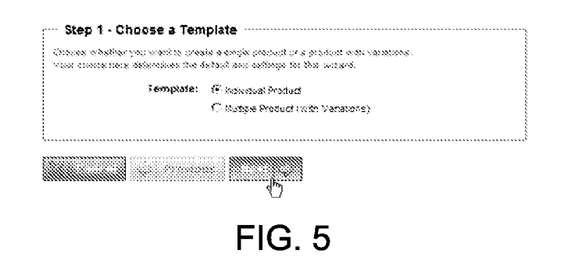
FIGS. 5 through 28 are sample user interface pages for creating individual POD products.
Figure 6:
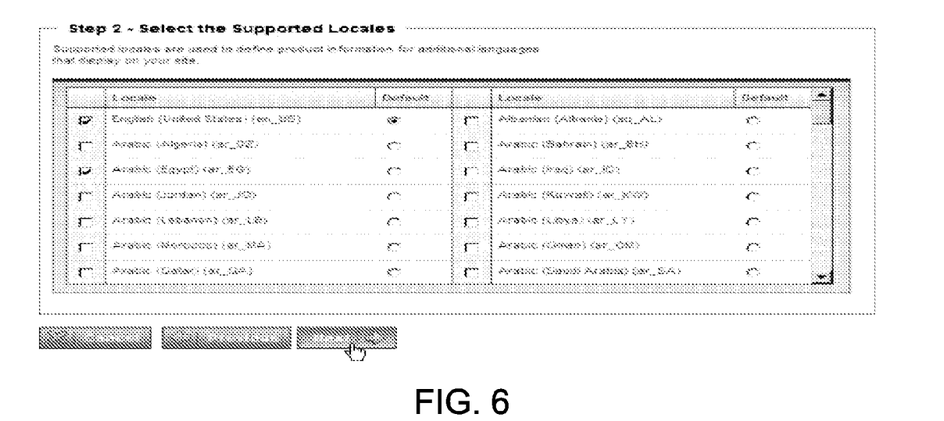
Figure 7:
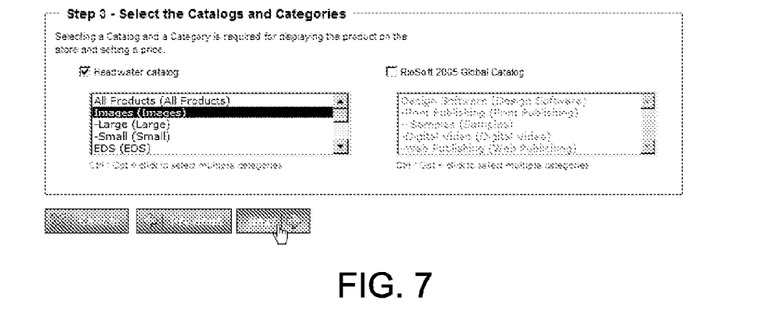
Figure 8:
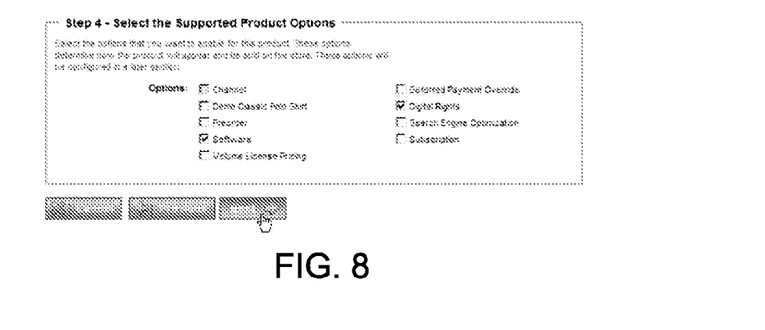
Figure 9:
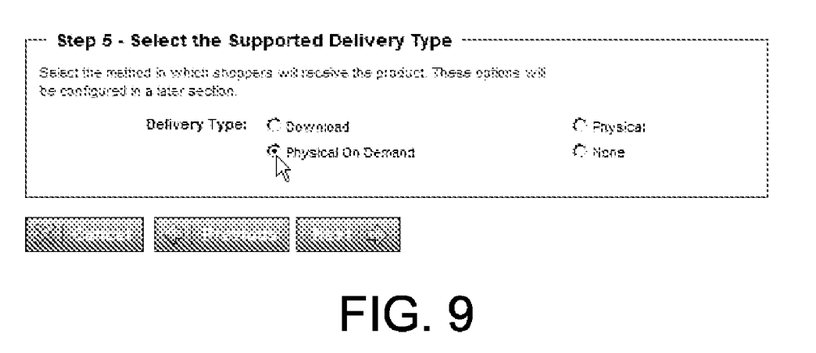

To create an individual POD product, in a Catalog menu (not shown), select New, and click Product. The first step of the Create New Product wizard appears. On the Template page as shown in FIG. 5, select Individual Product and click Next. On the Supported Locales page as shown in FIG. 6, select the locales you want to be supported for the product and click Next. On the Catalogs and Categories page shown in FIG. 7, select the catalog and category for the product and click Next. Products must be assigned to a catalog and category in order for them to appear on your site. On the Supported Product Options page shown in FIG. 8, select all the options for the product and click Next (you are not required to select any of these attributes when creating POD individual products). On the Supported Delivery Type page shown in FIG. 9, select the Physical on Demand option and click Next.

Figure 10:
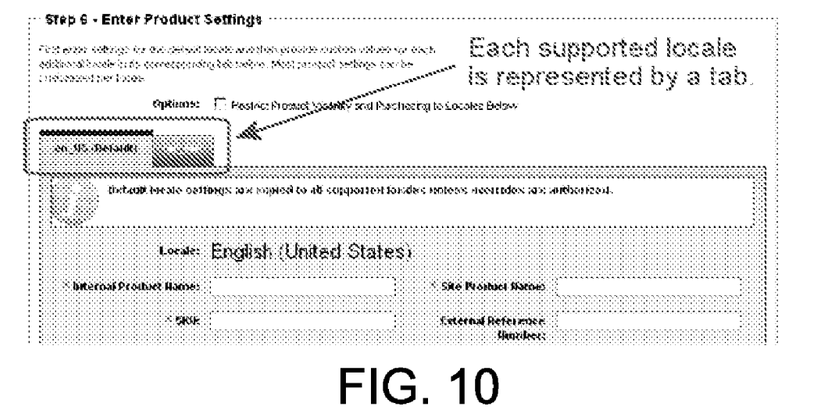
Figure 11:
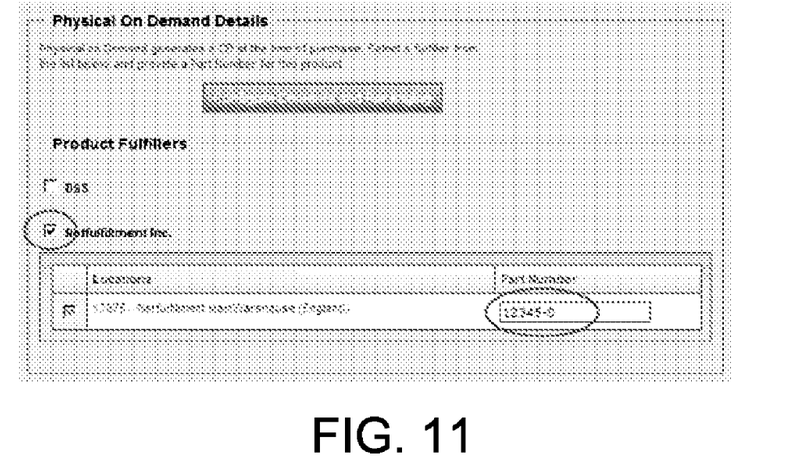

On the Product Settings page shown in FIG. 10, enter the product information for the default locale. If you chose to support additional locales, they are represented by tabs on the page and the default locale is selected when you come to this page. All information you enter on the default locale tab is copied to supporting locale tabs unless you go to a locale tab and change the information there. If you need help while creating a product, click one of the links in the Help pane at left or see the Catalog User Guide. When you are ready to enter the POD information, scroll down to the Physical On Demand Details section as shown in FIG. 11. In the Product Fulfillers area, select the fulfiller you have a POD contract with. This is the party that will complete the physical shipment of the product. Then, enter the Part Number for the product in the field provided. This is the number assigned by the fulfiller to track the product. Click Configure Contents and Packaging.

Figure 12:
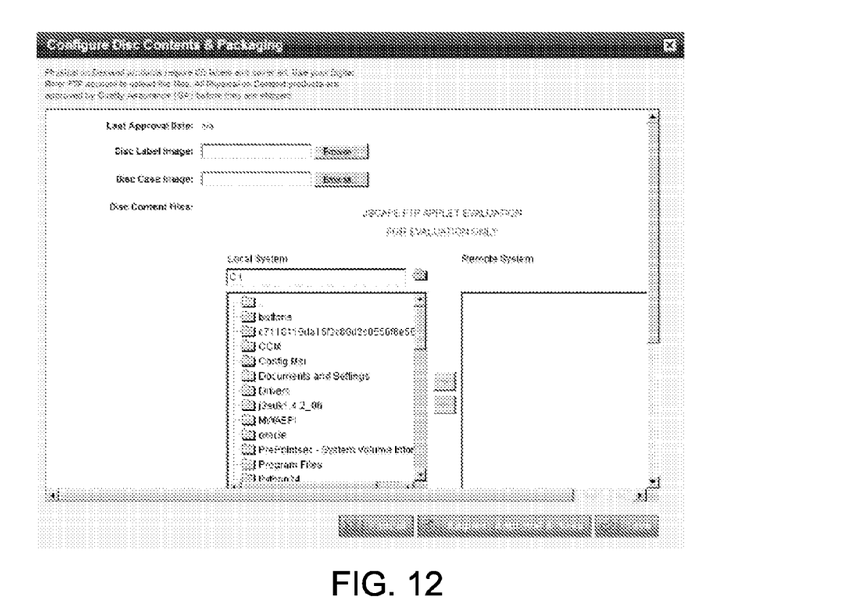
Figure 13:
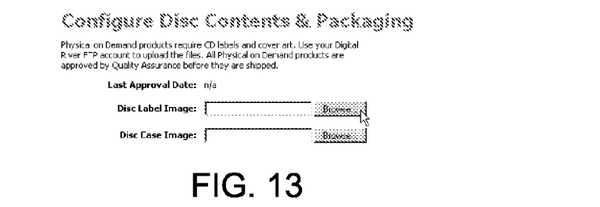

The Configure Disc Contents & Packaging window appears as shown in FIGS. 12 and 13. This is where you set up the physical packaging and CD content for the physical product. In order to upload the POD content files and packaging images you must have a commerce engine FTP account. Click Browse next to the Disc Label Image field and select the image that will be printed on the CD itself. The file should meet the following criteria:

The image should be a JPEG (.jpg) file saved with a resolution of 300 DPI. Images with higher resolutions will not fit in the space available.

The top 50% of the disc is where the label is printed. The area is 4.75 inches. Any other space that needs to be used must be negotiated with the commerce engine provider as the bottom portion of the disc is reserved for shipping and other information.

Click Browse next to the Disc Case Image field to select the file that will be used for the artwork for the CD case image. The file should meet the following criteria:

The file must be a PDF saved with a resolution of 300 DPI. Files with a higher resolution will not fit in the space available for the case artwork.

The total image size should be 7.25×10.75 inches.

The image must include crop marks and at least a ¼ inch bleed. The bleed area is not printed; it ensures that your design extends to the edge of the cover.

The text can be no closer than ¼ inches from the edge. This ensures that the text will not get cut off the final printed cover.

Click Connect near the bottom. The Connect dialog box appears. Enter your Username and Password and click OK. You are connected to the remote system and can select the files you want to have burned onto the physical disc (files cannot exceed 680 MB for a CD but for DVDs the files could be larger).

To add a file or directory from the Local System list, select the file or directory from your computer and click >> to add it to the remote system. The structure and files that appear in the Remote System area will be what is burned onto a CD for the POD product.

To remove a file or directory from the remote system, select the file or directory and click << to remove it.

When you are done setting up the disc contents and packaging, click Request Approval & Save to save the configuration and initiate the approval process. Click Save if you just want to save the information you have entered and will initiate the approval process later.

The approval process can take up to three days. After you request approval, the product is locked and you cannot modify the disc label or cover images or disc file content. After you are notified that the product is approved, you can then approve or reject the product as needed. See Approving POD Products for more information.

When you return to the Product Settings page, finish entering any information about the product (including any information for supported locales) and click Next when done.

Figure 14:
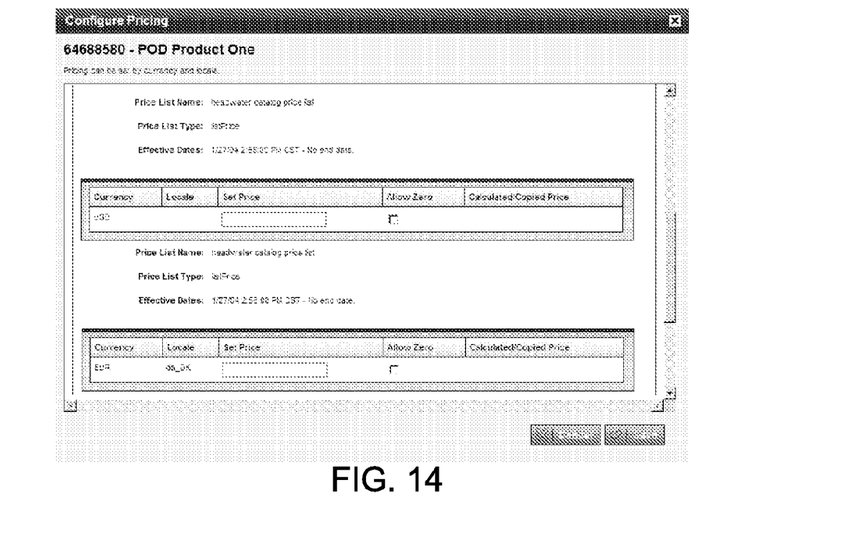

On the Pricing page shown in FIG. 14, click Set Pricing. The Configure Pricing window appears. This window shows all the supported currencies for the price lists on your site. Each currency is listed separately and the price list that the currency belongs too is indicated above the currency table. In the Set Price field for each locale, enter a price for the product. Select Allow Zero if you want to allow a zero price for the product (used if the product is a free promotional product or giveaway). Repeat for all currencies in all locales that you want to set for the product. When you are done, click Save to return to the Pricing page. On the Pricing page, click Finish to complete the product wizard. The product is created and you are taken to the Products list page. From there you can see the product you just created in the list. Continue to Approving POD Products for more information about what to do next to approve your product and deploy it on your site.

Creating Products with POD Variations

Figure 15:
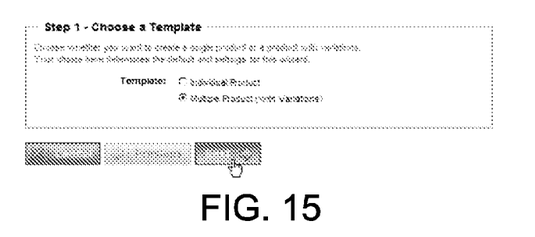

If a user selects multiple products as shown in FIG. 15, which is like the page as shown in FIG. 5, a user may create multiple products with POD variations. As previously described, in a Catalog menu (not shown), select New, and click Product. The first step of the Create New Product wizard appears. On the Template page as shown in FIG. 11, select Multiple Product (with Variations) and click Next.

Figure 16:
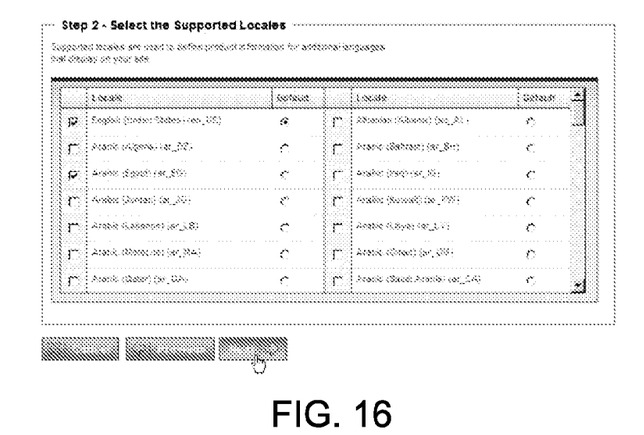
Figure 17:
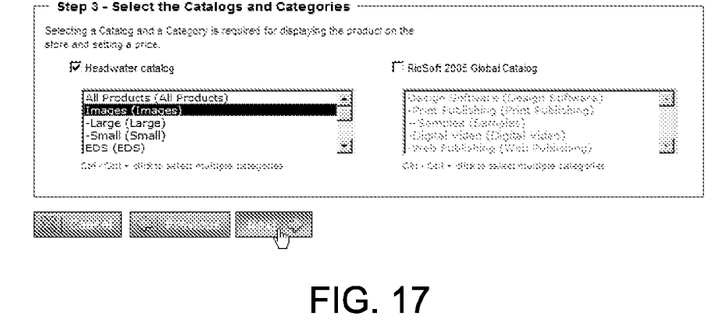
Figure 18:
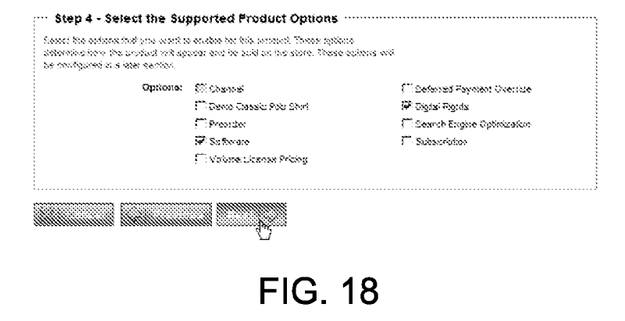

On the Supported Locales page as shown in FIG. 16, select the locales you want to be supported for the product and click Next. On the Catalogs and Categories page as shown in FIG. 17, select the catalog and category for the product and click Next. Products must be assigned to a catalog and category in order for them to appear on your site. On the Supported Product Options page as shown in FIG. 18, select the options for the base product and any variations you plan to create. The options you select here can be used to vary the product by in a later step. When you are done, click Next.

Figure 19:
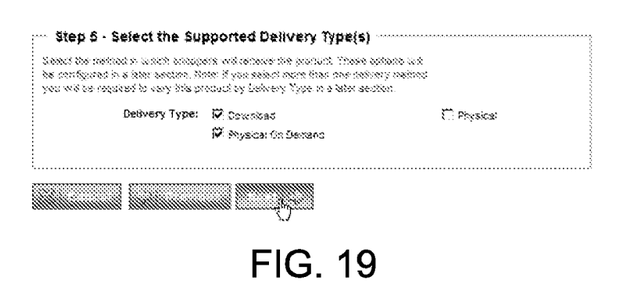
Figure 20:
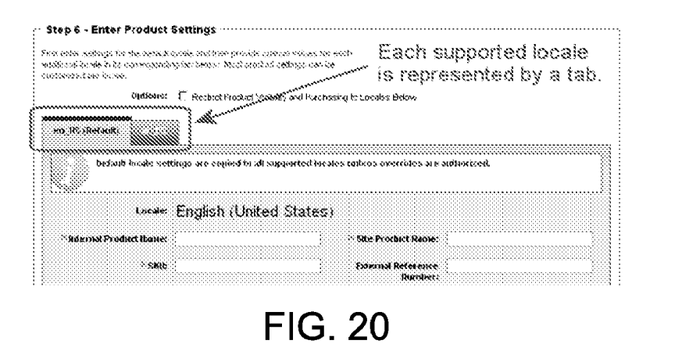
Figure 21:
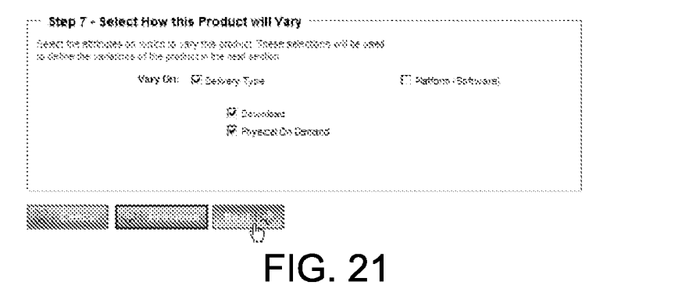
Figure 22:
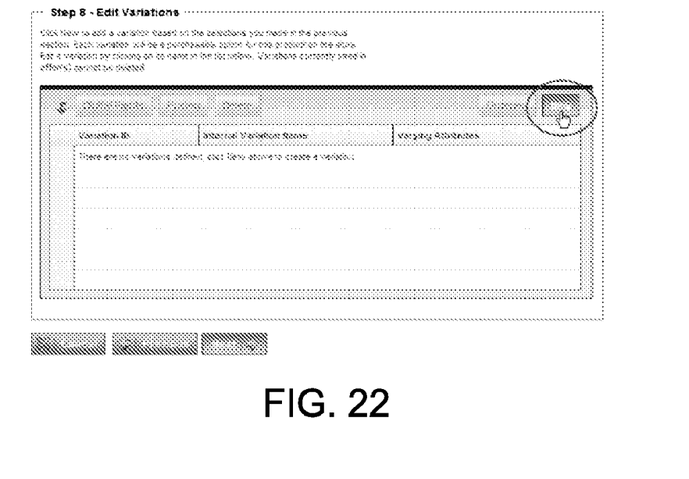
Figure 23:
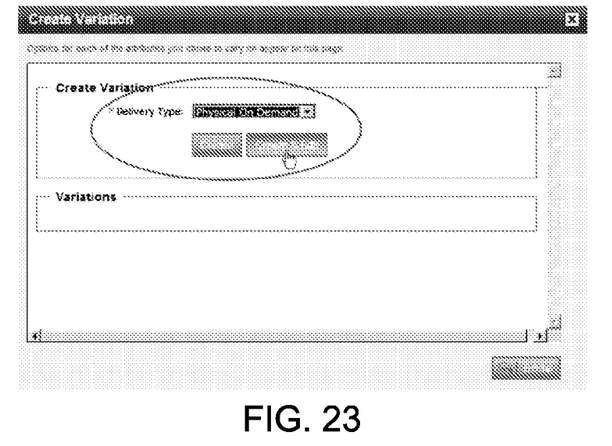
Figure 24:
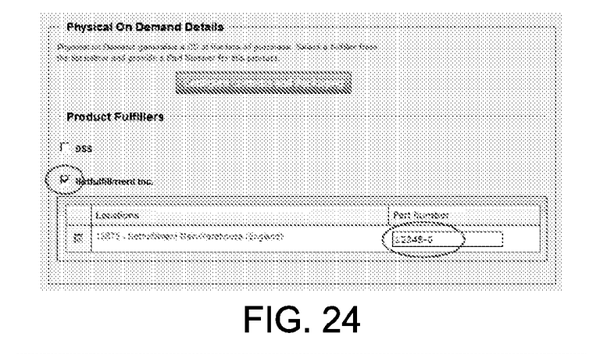

On the Supported Delivery Type page as shown in FIG. 19, select the Physical on Demand check box. You should also select any other Delivery Types you want for any variations you will create. If you select more than one delivery type here you must vary the product by a delivery type in a later step. On the Product Settings page as shown in FIG. 20, enter the base product information for the default and supported locales. Supported locales are represented by tabs on the page and the default locale is selected by default when you come to this page. All information you enter on the default locale tab is copied to supporting locale tabs unless you go to a locale tab and change the information there. Click Next when you are done. On the How This Product Will Vary page as shown in FIG. 21, select how you want the product to vary. The Product Options and Delivery Types you selected are shown on this page. Select as many vary by attributes as needed. On the Edit Variations page as shown in FIG. 22, click New. The Create Variations window appears as shown in FIG. 23. From the lists that appear, select a configuration for the POD variation and click Create & Edit. For example, if you selected to vary by Delivery Type, select Physical On Demand. On the Edit Variation page for the POD variation you just created, scroll down to the Physical On Demand Details section as shown in FIG. 24. In the Product Fulfillers area, select the fulfiller you have a POD contract with. This is the party that will complete the physical shipment of the POD product. Enter the Part Number for the product in the field provided. This is the number assigned by the fulfiller to track the product. Click Configure Contents and Packaging.

Figure 25:
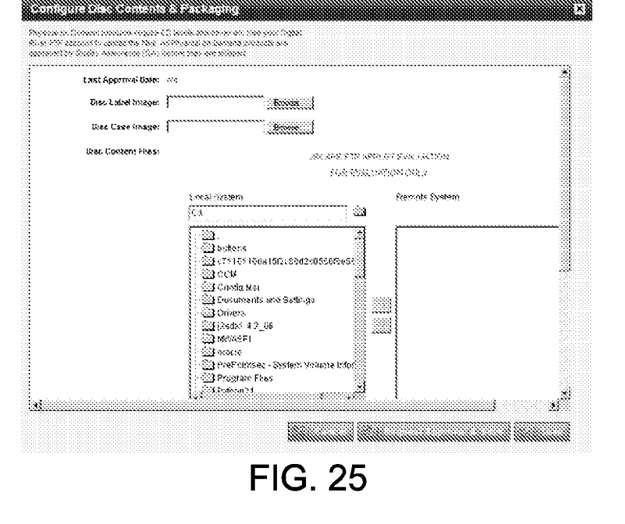
Figure 26:
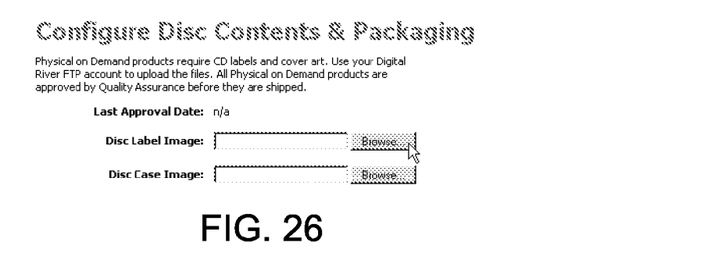

The Configure Disc Contents & Packaging window appears as shown in FIGS. 25 and 26. This is where you set up the physical packaging and CD content for the POD product. In order to upload the POD content files and packaging images you must have a commerce engine FTP account.

Click Browse next to the Disc Label Image field and select the image that will be printed on the CD itself. The file should meet the following criteria:

The image must be a JPEG (.jpg) file saved with a resolution of 300 DPI. Images with higher resolutions will not fit in the space available.

The top 50% of the disc is where the label will be printed. The area is 4.75 inches. Any other space that needs to be used will have to be negotiated with your commerce engine provider as the bottom portion of the disc is reserved for shipping and other information.

Click Browse next to the Disc Case Image field to select the file that will be used for the artwork for the CD case image. The file should meet the following criteria:

The file must be a PDF saved with a resolution of 300 DPI. Files with a higher resolution will not fit in the space available for the case artwork.

The total image size should be 7.25×10.75 inches.

The image must include crop marks and at least a ¼ inch bleed. The bleed area is not printed; it ensures that your design extends to the edge of the cover.

The text can be no closer than ¼ inches from the edge. This ensures that the text will not get cut off the final printed cover.

Click Connect near the bottom. The Connect dialog box appears (not shown). Enter your Username and Password and click OK. You are connected to the remote system and can select the files you want to have burned onto the physical disc (files cannot exceed 680 MB or larger if working with a DVD).

To add a file or directory from the Local System list, select the file or directory from your computer and click >> to add it to the remote system. The structure and files that appear in the Remote System area will be what is burned onto a CD for the POD product.

To remove a file or directory from the remote system, select the file or directory and click << to remove it.

When you are done setting up the disc contents and packaging, click Request Approval & Save to save the configuration and initiate the approval process. Click Save if you just want to save the information you have entered and will initiate the approval process later. The approval process can take some time. After you request approval, the product is locked and you cannot modify the disc label or cover images or disc file content. After you are notified that the product is approved, you can then approve or reject the product as needed. See Approving POD Products for more information.

Figure 27:
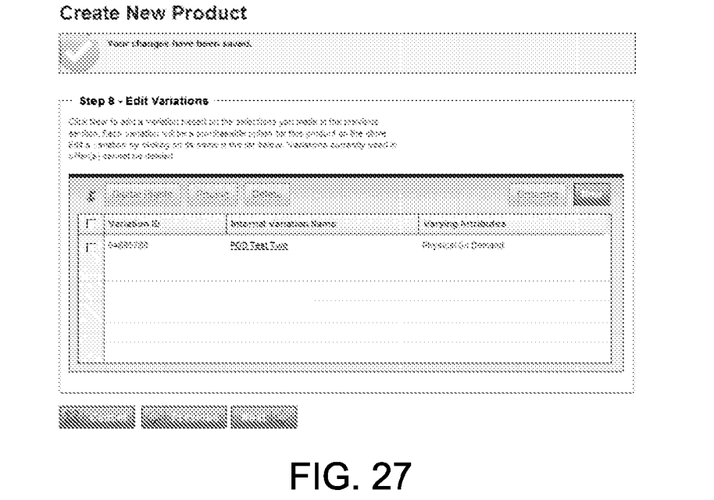

When you return to the Edit Variation page for the POD variations, enter any other information for the POD variation that you want. Make sure to enter any locale-specific information for any supported locales (click a locale tab at the top to change the locale). When you are done defining the variation details, click Save at the bottom to continue to create and define variations for the product. On the Edit Variations page as shown in FIG. 27, you can see the POD variation you just created and defined in the list. Click New to create another variation and then define the variation details as needed. When you are done creating and saving variations you should be returned to the Edit Variations page and you will see all the variations you created in the list. To change the order of the variations in the table (and therefore how they appear on your site), click Ordering. When you are done setting up the variations, click Next to continue the wizard.

Figure 28:
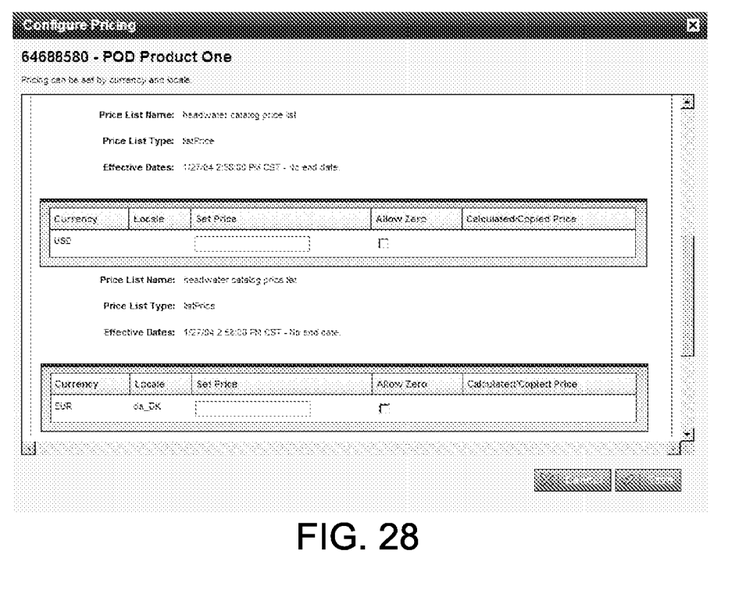

On the Pricing page (not shown), click Set Pricing. The Configure Pricing window appears as shown in FIG. 28. This window shows all the supported currencies for the price lists on your site. Each currency is listed separately and the price list that the currency belongs too is indicated above the currency table. In the Set Price field for each locale, enter a price for the base product. The price you enter here will be copied down to the variations but you can change that price as needed. Select Allow Zero if you want to allow a zero price for the product (used if the product is a free promotional product or giveaway). Repeat for all currencies in all locales that you want to set for the product. When you are done, click Save to return to the Pricing page. On the Pricing page, click Finish to complete the product wizard. The product is created and you are taken to the Products list page. From there you can see the product you just created in the list (click the + next to the product name to view the variations).

Approving POD Products

After you submit the disc contents and packaging for approval, the files are locked and cannot be changed (or deployed) until they have been approved or denied by the commerce engine provider. The approval process can take some time. Once you submit the POD files for approval, they are tested by quality assurance teams to verify that the product files and packaging are valid to create the POD product. Once a test of the POD product has been done, you will receive an email stating the product has been approved by your commerce engine provider and you can then give the final approval and deploy the product on your site.

Before you deploy, you may want to make the product "invisible" on your site and place a test order to see how the POD appears when completed. To make the product invisible, edit the product and clear the Display Product check box on the Edit Product page. After you deploy the product you can place a test order for the product. After you place a test order you can make the POD product purchasable by shoppers on your site by re-selecting the Display Product check box on the Edit Product page and deploying those changes.

Figure 29:
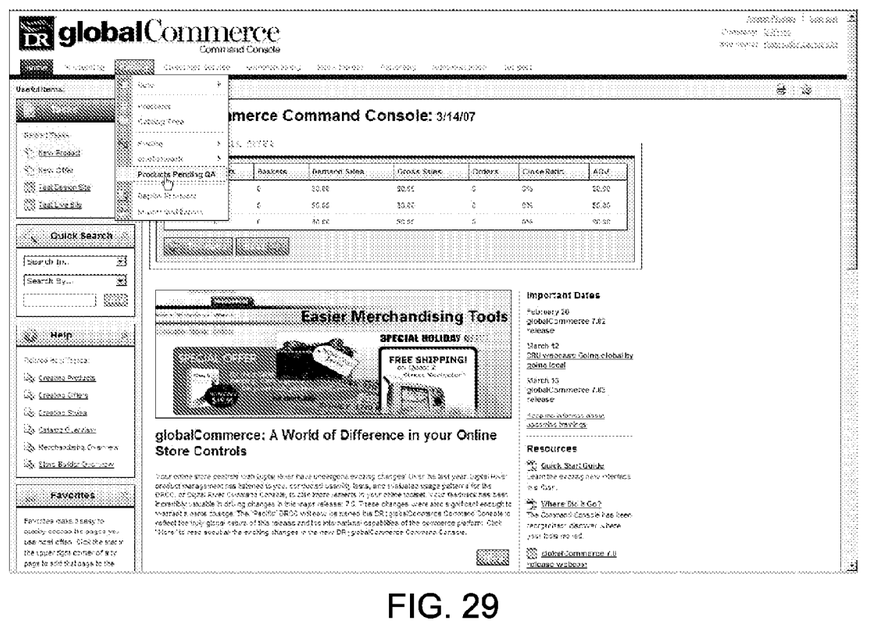
FIGS. 29 through 31 are sample user interface pages for approving POD products.

To approve a POD product both QA and the product owner must perform similar steps. These steps are:

QA and the product owner may be emailed that the product is waiting for approval at which point a user logs onto the Command Console. Then, on the Catalog menu as shown in FIG. 29, select Products. The Products list page appears.

Figure 30:
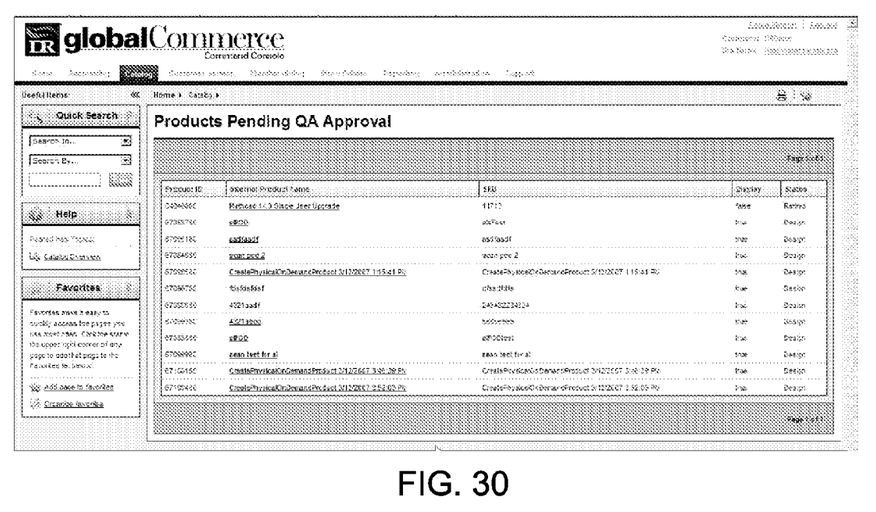

QA may see all of the products waiting for approval. In contrast, the product owner may only see a list of their products waiting for approval. Click on the name of the POD product (or the POD variation) from the Products list to edit it as shown in FIG. 30.

Figure 31:
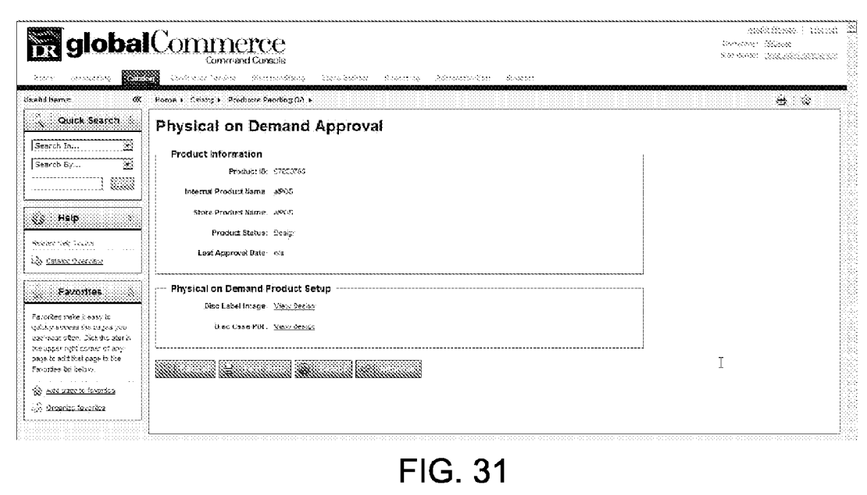

The Physical on Demand Approval page appears as is shown in FIG. 31. Most of the window will appear blank because the POD product files are locked and awaiting approval. You can click the links in the window to view the disc label or disc packaging files you previously uploaded. To approve the product, click Approve. The disc content and packaging files are locked and the product can now be deployed. You cannot change the disc contents and packaging files without going through the approval process again. To reject the product, click Reject. If you reject the product, the files are unlocked and you can make changes to the files and request approval again. To do a test burn of the product, click Test Burn and the steps described in reference to FIG. 4 will be performed.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

I claim:

1. A method for testing versions for remote manufacturing of digital media from user input communicated through a network to a commerce engine operating on a server, comprising:

providing to a user a web browser-based interface through the network to the commerce engine for creation of a physical on demand product;

creating a product version for the physical on demand product through the web browser-based commerce engine interface, the created product version of the product including an electronic copy of a product and information about the product;

requesting approval of the created product version of the product through the web browser-based commerce engine interface from a quality assurance team;

providing test order capability to the user via the web browser-based interface after approval from the quality assurance team such that the user may have a physical on demand product order fulfilled prior to release of the created product version of the product for general sale in a commerce engine; and processing the delivery of the test order through the network to a remote manufacturing system production lab to create a test disc of the created product version of the product based upon the user requesting the test order.

2. The method of claim 1 further comprising a step of locking the created product version of the product to prevent changes of information while pending approval from the quality assurance team.

3. The method of claim 1 further comprising a step of providing test order fulfillment capability to a tester user after approval from the quality assurance team such that the tester user may have a physical on demand product order fulfilled prior to release of the created product version of the product for general sale in the commerce engine.

4. The method of claim 3 wherein the processing step comprises not fulfilling the test order unless the tester user has requested the test order.

5. The method of claim 1 wherein the processing step comprises not fulfilling the test order unless the user has requested the test order.

6. The method of claim 1 wherein the processing step comprises not fulfilling the test order when the test order contains products from more than one product owner.

7. The method of claim 1 further comprising a step of fulfilling the test order through a test burn process to remotely manufacture software media only after the test order was requested.

8. An apparatus for testing versions for remote manufacturing of digital media from user input communicated through a network, the apparatus comprising a commerce engine operating on a server having a memory and a processor and further comprising:

a product version creation module containing program code stored in the server memory which when executed by the processor in the server causes the server to perform operations of creating, by input from a user, a product version for the physical on demand product in the commerce system, the created product version of the product including an electronic copy of a product and information about the product;

an approval module containing program code stored in the server memory which when executed by the processor in the server causes the server to perform operations of requesting approval of the created product version of the product from a quality assurance team;

a test order module containing program code stored in the server memory which when executed by the processor in the server causes the server to perform operations of providing test order capability to the user after approval from the quality assurance team such that the user may have a physical on demand product order fulfilled prior to release of the created product version of the product for general sale in a commerce engine; and a processing module containing program code stored in the server memory which when executed by the processor in the server causes the server to perform operations of processing the delivery of the test order to a remote manufacturing system production lab to create a test disc of the created product version of the product based upon the user requesting the test order.

9. The apparatus of claim 8 wherein the approval module includes program code stored in the server memory which when executed by the processor in the server causes the server to perform operations of locking the created product version of the product to prevent changes of information while pending approval from the quality assurance team.

10. The apparatus of claim 8 wherein the test order module includes program code stored in the server memory which when executed by the processor in the server causes the server to perform operations of providing test order fulfillment capability to a tester user after approval from the quality assurance team such that the tester user may have a physical on demand product order fulfilled prior to release of the created product version of the product for general sale in the commerce engine.

11. The apparatus of claim 10 wherein the processing module includes program code stored in the server memory which when executed by the processor in the server causes the server to not fulfill the test order unless the tester user has requested the test order.

12. The apparatus of claim 8 wherein the processing module includes program code stored in the server memory which when executed by the processor in the server causes the server to not fulfill the test order unless the user has requested the test order.

13. The apparatus of claim 8 wherein the processing module includes program code stored in the server memory which when executed by the processor in the server causes the server to not fulfill the test order when the test order contains products from more than one product owner.

14. The apparatus of claim 8 wherein the processing module includes program code stored in the server memory which when executed by the processor in the server causes the server to perform operations of fulfilling the test order through a test burn process to remotely manufacture software media only after the test order was requested.

\* \* \* \* \*